(12) United States Patent
Nakai et al.

(10) Patent No.: US 11,703,479 B2
(45) Date of Patent: Jul. 18, 2023

(54) INSPECTION DEVICE, PROCESSING DEVICE AND INSPECTION METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yutaka Nakai, Kanagawa (JP); Tomio Ono, Kanagawa (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

(*) Notice: Subject to any disclaimer, the term of this patent is extended or adjusted under 35 U.S.C. 154(b) by 0 days.

(21) Appl. No.: 17/665,834

(22) Filed: Feb. 7, 2022

(65) Prior Publication Data

US 2023/0054123 A1    Feb. 23, 2023

(30) Foreign Application Priority Data

Aug. 17, 2021 (JP) ................. 2021-132583

(51) Int. Cl.
*G01N 29/44* (2006.01)
*G01N 29/04* (2006.01)

(52) U.S. Cl.
CPC ....... *G01N 29/041* (2013.01); *G01N 29/4409* (2013.01); *G01N 2291/0237* (2013.01); *G01N 2291/048* (2013.01)

(58) Field of Classification Search
CPC ............. G01N 29/041; G01N 29/4409; G01N 2291/0237; G01N 2291/048
See application file for complete search history.

(56) References Cited

U.S. PATENT DOCUMENTS

2004/0150155 A1   8/2004  Okitsu
2012/0061901 A1   3/2012  Yamamoto
(Continued)

FOREIGN PATENT DOCUMENTS

JP    2000-025988 A   1/2000
JP    3860126 B2   12/2006
(Continued)

OTHER PUBLICATIONS

U.S. Appl. No. 17/192,024, filed Mar. 4, 2021, Nakai.

*Primary Examiner* — Suman K Nath
(74) *Attorney, Agent, or Firm* — Foley & Lardner LLP

(57) ABSTRACT

According to an embodiment, an inspection device includes a transmitter, a receiver, and a processor. The transmitter transmits a first ultrasonic wave including burst waves of a first period. The first ultrasonic wave is incident on an inspection object between the transmitter and the receiver. The first ultrasonic wave passed through the inspection object is incident on the receiver. The receiver outputs a signal corresponding to the first ultrasonic wave. The processor obtains the signal and performs a first operation. The first operation includes deriving first and second signal values from the signal, and inspecting the inspection object based on at least one of the first signal values and at least one of the second signal values. The first signal values correspond to maximum values of the signal in each of first periods The second signal values correspond to maximum values of the signal in each of second periods.

19 Claims, 6 Drawing Sheets

(56) References Cited

U.S. PATENT DOCUMENTS

| | | | |
|---|---|---|---|
| 2018/0231501 A1* | 8/2018 | Findikoglu | G01N 29/46 |
| 2020/0141906 A1* | 5/2020 | Kimura | G01N 29/48 |
| 2021/0123796 A1 | 4/2021 | Itsumi | |
| 2021/0333137 A1* | 10/2021 | Teboulle | G01F 1/668 |
| 2022/0065820 A1 | 3/2022 | Nakai et al. | |

FOREIGN PATENT DOCUMENTS

| | | |
|---|---|---|
| JP | 2012-063276 A | 3/2012 |
| JP | 2021-067543 A | 4/2021 |
| JP | 2022-042612 A | 3/2022 |

* cited by examiner

INSPECTION DEVICE, PROCESSING DEVICE AND INSPECTION METHOD

CROSS-REFERENCE TO RELATED APPLICATIONS

This application is based upon and claims the benefit of priority from Japanese Patent Application No. 2021-132583, filed on Aug. 17, 2021; the entire contents of which are incorporated herein by reference.

FIELD

Embodiments described herein relate generally to an inspection device, a processing device and an inspection method.

BACKGROUND

For example, there is an inspection device using ultrasonic waves or the like. Improvement of inspection accuracy is desired.

DETAILED DESCRIPTION

Figure 1:
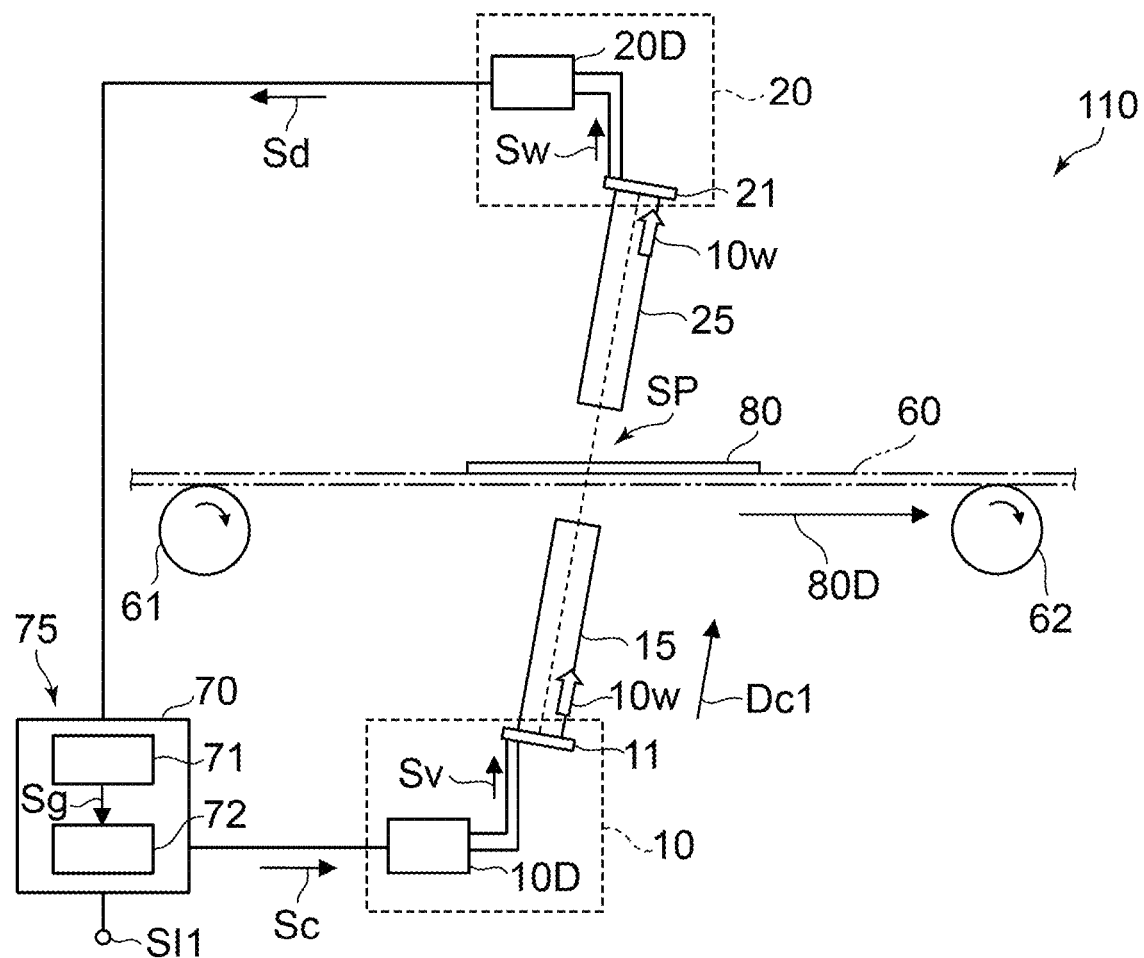
FIG. 1 is a schematic side view illustrating an inspection device according to a first embodiment.

According to one embodiment, an inspection device includes a transmitter, a receiver, and a processor. The transmitter is configured to transmit a first ultrasonic wave including a plurality of burst waves of a first period. The first ultrasonic wave is configured to be incident on an inspection object between the transmitter and the receiver. The first ultrasonic wave passed through the inspection object is incident on the receiver. The receiver is configured to output a signal corresponding to the first ultrasonic wave incident on the receiver. The processor is configured to obtain the signal and to perform a first operation. The first operation includes deriving a plurality of first signal values and a plurality of second signal values from the signal, and inspecting the inspection object based on at least one of the first signal values and at least one of the second signal values. The first signal values correspond to maximum values of the signal in each of a plurality of first periods having the first period derived from the signal. The first signal values correspond to an intensity of a direct wave of the first ultrasonic wave. The second signal values correspond to maximum values of the signal in each of a plurality of second periods having the first period derived from the signal. One of the first periods is between one of the second periods and an other of the second periods. The other one of the second periods is closest to the one of the second periods among the second periods.

According to one embodiment, a processing device includes a processor configured to obtain a signal output from a receiver and to perform a first operation. A first ultrasonic wave includes a plurality of burst waves of a first period transmitted from the transmitter being incident on an inspection object between the transmitter and the receiver. The first ultrasonic wave passed through the inspection object is incident on the receiver. The receiver is configured to output the signal corresponding to the first ultrasonic wave incident on the receiver. The first operation includes deriving a plurality of first signal values and a plurality of second signal values from the signal, and inspecting the inspection object based on at least one of the first signal values and at least one of the second signal values. The first signal values correspond to maximum values of the signal in each of a plurality of first periods having the first period derived from the signal. The first signal values correspond to an intensity of a direct wave of the first ultrasonic wave. The second signal values correspond to a maximum value of the signal in each of a plurality of second periods having the first period derived from the signal. One of the first periods is between one of the second periods and an other of the second periods. The other one of the second periods is closest to the one of the second periods among the plurality of second periods.

According to one embodiment, an inspection method includes obtaining a signal output from a receiver, and performing a first operation. A first ultrasonic wave includes a plurality of burst waves of a first period transmitted from the transmitter being incident on an inspection object between the transmitter and the receiver. The first ultrasonic wave passed through the inspection object is incident on the receiver. The receiver is configured to output the signal corresponding to the first ultrasonic wave incident on the receiver. The first operation including: deriving a plurality of first signal values and a plurality of second signal values from the signal, and inspecting the inspection object based on at least one of the first signal values and at least one of the second signal values. The first signal values correspond to maximum values of the signal in each of a plurality of first periods having the first period derived from the signal. The first signal values correspond to an intensity of a direct wave of the first ultrasonic wave. The second signal values correspond to a maximum value of the signal in each of a plurality of second periods having the first period derived from the signal. One of the first periods is between one of the second periods and an other of the second periods. The other one of the second periods is closest to the one of the second periods among the second periods.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in reference to a drawing therein above are marked with like reference numerals, and a detailed description is omitted as appropriate.

First Embodiment

FIG. 1 is a schematic side view illustrating an inspection device according to a first embodiment.

As shown in FIG. 1, an inspection device 110 according to the embodiment includes a transmitter 10, a receiver 20, and a processor 70. The inspection device 110 may include a support portion 60.

The transmitter 10 is configured to transmit a first ultrasonic wave 10w. The first ultrasonic wave 10w includes a plurality of burst waves of a first period. A examples of the first ultrasonic wave 10w will be described later.

The first ultrasonic wave 10w is incident on an inspection object 80 between the transmitter 10 and the receiver 20. The first ultrasonic wave 10w passed through the inspection object 80 is incident on the receiver 20. The receiver is configured to output a signal Sd. The signal Sd corresponds to the first ultrasonic wave 10w incident on the receiver 20.

The support portion 60 is provided between the transmitter 10 and the receiver 20. The support portion 60 is configured to support the inspection object 80. The inspection object 80 passes through a space SP between the transmitter 10 and the receiver 20 along a transport direction 80D.

The inspection object 80 is, for example, a banknote. The inspection object may be paper sheets such as securities. The material of the inspection object 80 is arbitrary. The inspection object 80 includes, for example, at least one of paper and resin.

As shown in FIG. 1, a direction from the transmitter 10 to the receiver 20 is defined as a first direction Dc1. The first direction Dc1 crosses the transport direction 80D. The first direction Dc1 may be inclined with respect to the transport direction 80D.

For example, the support portion 60 is transported by a first transport portion 61 (for example, a roller) and a second transport portion 62 (for example, a roller). The inspection object 80 is placed on the support portion 60. In accordance with a transportation by the support portion 60, the inspection object 80 is transported along the transport direction 80D.

For example, the transmitter 10 includes a first element 11. The first element 11 includes a film portion being deformable. The film portion of the first element 11 emits the first ultrasonic wave 10w. A transmission circuit 10D is connected with the first element 11. The film portion of the first element 11 is deformed by a drive signal Sv from the transmission circuit 10D, and the first ultrasonic wave 10w is emitted. The deformation of the film portion of the first element 11 is caused by, for example, a piezoelectric element or the like.

For example, the receiver 20 includes a second element 21. The second element 21 includes a film portion being deformable. The film portion of the second element 21 is deformed by the first ultrasonic wave 10w being received. A signal Sw is obtained in accordance with the deformation of the film portion of the second element 21. For example, the deformation of the film portion of the second element 21 is converted into an electric signal by a piezoelectric element or the like. For example, the signal Sw output from the second element 21 is supplied to a receiving circuit 20D. The receiving circuit 20D amplifies the signal Sw and outputs the signal Sd.

As shown in FIG. 1, the transmitter 10 may include a first waveguide portion 15. The first ultrasonic wave 10w generated by the first element 11 passes through the first waveguide section 15 and proceeds toward the receiver 20. The receiver 20 may include a second waveguide portion 25. The first ultrasonic wave 10w passed through the space SP including the inspection object 80 passes through the second waveguide section 25 and proceeds toward the receiver 20.

The processor 70 may supply a control signal Sc to the transmission circuit 10D, for example. The transmission circuit 10D deforms the film portion of the first element 11 in response to the control signal Sc. As a result, the first ultrasonic wave 10w is emitted from the transmitter 10. The first ultrasonic wave 10w emitted from the transmitter 10 passes through, for example, the inspection object 80 and is incident on the receiver 20. The first ultrasonic wave 10w incident on the receiver 20 changes according to a state of the inspection object 80. The first ultrasonic wave 10w be changing is received by the receiver 20. The signal Sd output from the receiver 20 reflects the state of the inspection object 80.

For example, the signal Sd is supplied to the processor 70. The processor 70 can process the signal Sd and output an inspection signal SI1. The inspection signal SI1 includes information regarding the inspection result of the inspection object 80.

The processor 70 includes, for example, a first circuit portion 71 and a second circuit portion 72. The first circuit portion 71 includes, for example, a peak hold circuit. The first circuit portion 71 obtains the signal Sd obtained from the receiver 20. The first circuit portion 71 samples the signal Sd and extracts a plurality of peak values (maximum values). The second circuit portion 72 obtains the plurality of peak values obtained from the first circuit portion 71, and outputs an inspection result based on the plurality of peak values as the inspection signal SI1.

The second circuit portion 72 may include an analog circuit. The second circuit portion 72 may include a digital circuit. The second circuit portion 72 may include, for example, a comparator or the like. The processor 70 may include an electric circuit (for example, a computer) such as a CPU (Central Processing Unit).

The first ultrasonic wave 10w emitted from the transmitter 10 may be controlled by a drive signal Sv from the transmission circuit 10D. For example, the first period of the first ultrasonic wave 10w can be controlled by the drive signal Sv. For example, a temporal width of a plurality of burst waves may be controlled by the drive signal Sv. The drive signal Sv from the transmission circuit 10D may be controlled by the control signal Sc from the processor 70.

Hereinafter, an example of the first ultrasonic wave 10w emitted from the transmitter 10 will be described.

Figure 2A:
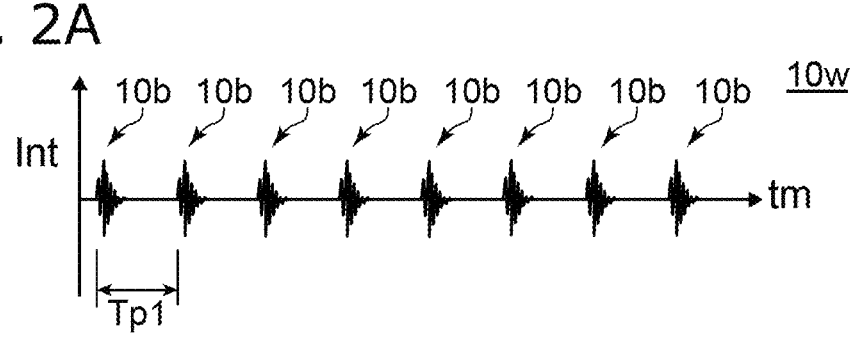
FIGS. 2A and 2B are schematic views illustrating operation of the inspection device according to the first embodiment.
Figure 2B:
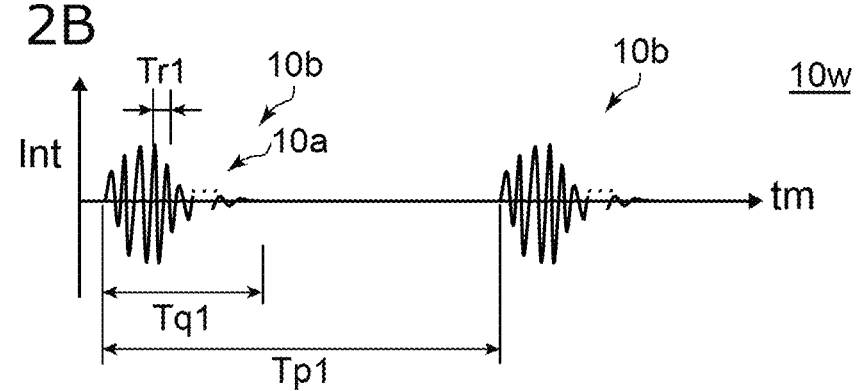

FIGS. 2A and 2B are schematic views illustrating an operation of the inspection device according to the first embodiment. The horizontal axis of these figures is time tm.

The vertical axis of these figures is the intensity Int of the first ultrasonic wave 10w. FIG. 2B shows an enlarged time tm shown in FIG. 2A.

As shown in FIG. 2A, the first ultrasonic wave 10w includes a plurality of burst waves 10b. The period of the plurality of burst waves 10b is the first period Tp1. In one example, the first period Tp1 is, for example, not less than 0.05 ms and not more than 1 ms.

As shown in FIG. 2B, one of the plurality of burst waves 10b includes a plurality of vibration waves 10a. The plurality of vibration waves 10a are, for example, ultrasonic waves. The frequency of the plurality of vibration waves 10a is, for example, not less than 30 kHz and not more than 120 kHz. The period Tr1 of the plurality of vibration waves 10a is the reciprocal of the frequencies of the plurality of vibration waves 10a. One length Tq1 of the plurality of burst waves 10b is, for example, not less than 8 μs and not more than 0.5 ms.

Such a first ultrasonic wave 10w is incident on the inspection object 80. Foreign matter or the like may adhere to the inspection object 80. The intensity of the first ultrasonic wave 10w incident on the receiver 20 changes depending on the presence or absence of foreign matter. By detecting the change in strength, the presence or absence of the foreign matter can be detected.

A part of the first ultrasonic wave 10w incident on the inspection object 80 passes through the inspection object 80 and directly incidents on the receiver 20. The component directly incident on the receiver 20 corresponds to a direct wave.

For example, a part of the first ultrasonic wave 10w incident on the receiver 20 may be reflected by the receiver 20 and re-entered on the inspection object 80. The first ultrasonic wave 10w re-entered the inspection object 80 is reflected by the inspection object 80 and re-enters the receiver 20. The component is reflected by the inspection object 80 and then enters the receiver 20 corresponds to a reflected wave.

In this way, the direct wave and the reflected waves are incident on the receiver 20. In general, direct waves are used for inspection and reflected waves are often regarded as inspection noise. Therefore, it is generally attempted to suppress the reflected waves.

In the embodiment, the reflected wave, which is generally regarded as noise, is used for the inspection. Hereinafter, an example of the operation in the embodiment will be described. The following operations correspond to, for example, the first operation performed by the processor 70.

Figure 3A:
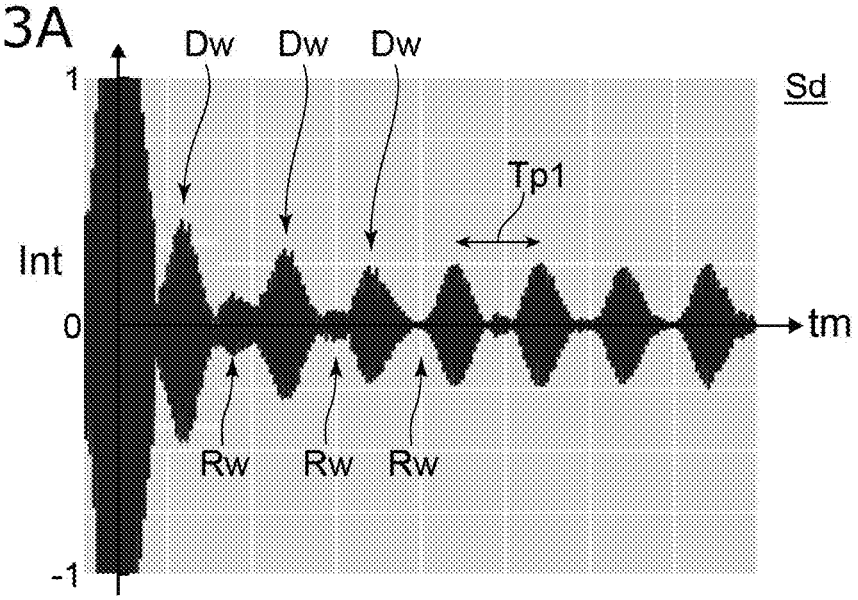
FIGS. 3A to 3C are schematic views illustrating the operation of the inspection device according to the first embodiment.
Figure 3B:
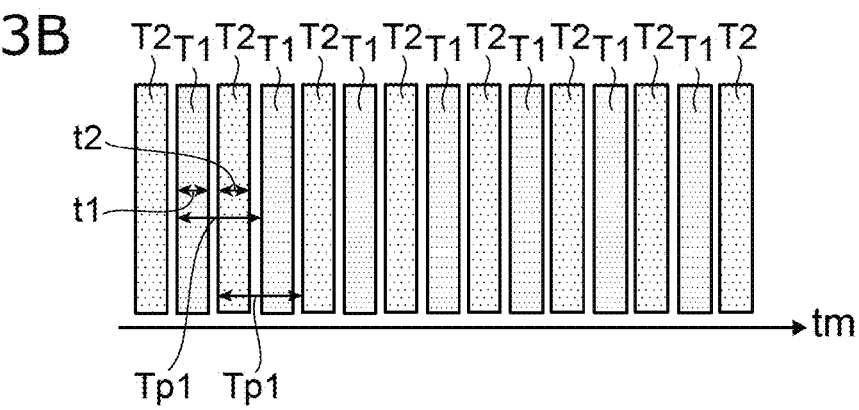
Figure 3C:
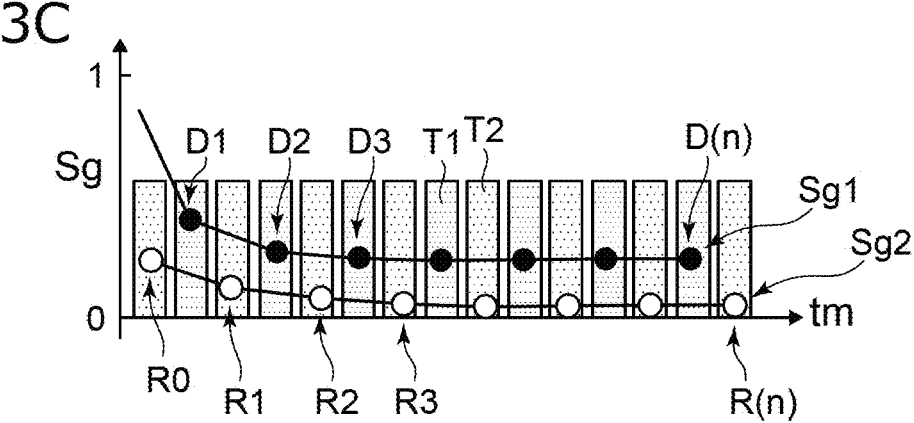

FIGS. 3A to 3C are schematic views illustrating the operation of the inspection device according to the first embodiment.

The horizontal axis of these figures is time tm. The vertical axis of FIG. 3A is the intensity Int of the signal Sd. The vertical axis of FIG. 3C corresponds to the magnitude Sg of the derived signal value (see FIG. 1).

FIG. 3A corresponds to the signal Sd. The signal Sd is output from the receiver 20. The signal Sd may be a signal amplified by the receiving circuit 20D. The signal Sd is input to the processor 70.

As shown in FIG. 3A, the signal Sd includes a plurality of direct waves Dw and a plurality of reflected waves Rw. The plurality of direct waves Dw have the same period as the first period Tp1. The plurality of reflected waves Rw have the same period as the first period Tp1. In absence of foreign matter, the intensity Int (amplitude) of the plurality of direct waves Dw is greater than the intensity Int (amplitude) of the plurality of reflected waves Rw. This is because in the reflected wave Rw, a loss occurs at the time of reflection.

FIG. 3B illustrates a plurality of first periods T1 and a plurality of second periods T2 applied to the obtained signal Sd. The plurality of first periods T1 are periods corresponding to a plurality of direct waves Dw. The plurality of second periods T2 are periods corresponding to the plurality of reflected waves Rw.

The period of the plurality of first periods T1 is the same as that of the first period Tp1. The period of the plurality of second periods T2 is the same as that of the first period Tp1. For example, the length t1 of each of the plurality of first periods T1 is smaller than 0.5 times the first period Tp1. The length t2 of each of the plurality of second periods T2 is smaller than 0.5 times the first period Tp1.

Such a plurality of first periods T1 can be set from the waveform of the first period Tp1 included in the signal Sd. For example, the period in which the intensity Int is relatively high corresponding to the direct wave Dw is defined as a plurality of first periods T1. For example, at least a part of the period between the plurality of first periods T1 is defined as the plurality of second periods T2. The first period T1 and the second period T2 are provided alternately.

FIG. 3C illustrates a plurality of first signal values Sg1 and a plurality of second signal values Sg2. The plurality of first signal values Sg1 can be derived from the signal Sd based on the plurality of first periods T1. The plurality of second signal values Sg2 can be derived from the signal Sd based on the plurality of second periods T2.

For example, the peak value (maximum value) in each of the plurality of first periods T1 can be derived by the first circuit portion 71 (for example, the peak hold circuit). The peak value in the plurality of first periods T1 corresponds to the plurality of first signal values Sg1. For example, the first circuit portion 71 can derive the peak value (maximum value) in each of the plurality of second periods T2. The peak values in the plurality of second periods T2 correspond to the plurality of second signal values Sg2.

The plurality of first signal values Sg1 include, for example, signal values D1, D2, D3 . . . D (n) and the like. The plurality of second signal values Sg2 include, for example, signal values R0, R1, R2, R3 . . . R (n) and the like. "n" is, for example, an integer of 2 or more.

In the embodiment, the inspection object 80 is inspected using the plurality of first signal values Sg1 and the plurality of second signal values Sg2. As a result, a highly accurate inspection can be performed as compared with an inspection using only a plurality of first signal values Sg1. According to the embodiment, it is possible to provide an inspection device capable of improving inspection accuracy.

In the embodiment, the processor 70 can obtain the signal Sd and perform the following first operation. The first operation includes deriving a plurality of first signal values Sg1 and a plurality of second signal values Sg2 from the signal Sd. This derivation can be performed, for example, by the first circuit portion 71. The first circuit portion 71 can derive a plurality of first signal values Sg1 and a plurality of second signal values Sg2 from the signal Sd.

The first operation includes inspecting the inspection object 80 based on at least one of the plurality of first signal values Sg1 and at least one of the plurality of second signal values Sg2. The process for the inspection can be performed by, for example, the second circuit portion 72. The second circuit portion 72 can inspect the inspection object 80 based on at least one of the plurality of first signal values Sg1 and at least one of the plurality of second signal values Sg2.

As described above, the plurality of first signal values Sg1 correspond to the maximum values of the signals Sd in each of the plurality of first periods T1. The plurality of first periods T1 are derived from the signal Sd. The plurality of first periods T1 have the first period Tp1. The plurality of first signal values Sg1 correspond to the intensity of the direct wave Dw of the first ultrasonic wave 10w.

As described above, the plurality of second signal values Sg2 correspond to the maximum values of the signals Sd in each of the plurality of second periods T2. The plurality of second periods T2 are derived from the signal Sd. The plurality of second periods T2 have the first period Tp1.

For example, one of the plurality of first periods T1 is between one of the plurality of second periods T2 and another one of the plurality of second periods T2. The other one of the plurality of second periods T2 is the closest to the one of the plurality of second periods T2 among the plurality of second periods T2.

For example, one of the plurality of second periods T2 is between one of the plurality of first periods T1 and another one of the plurality of first periods T1. The other one of the plurality of first periods T1 is the closest to the one of the plurality of first periods T1 among the plurality of first periods T1.

The above FIGS. 3A to 3C correspond to the case where no foreign matter is present in the inspection object 80. Hereinafter, an example of false detection when no foreign matter is present in the inspection object 80 will be described.

Figure 4A:
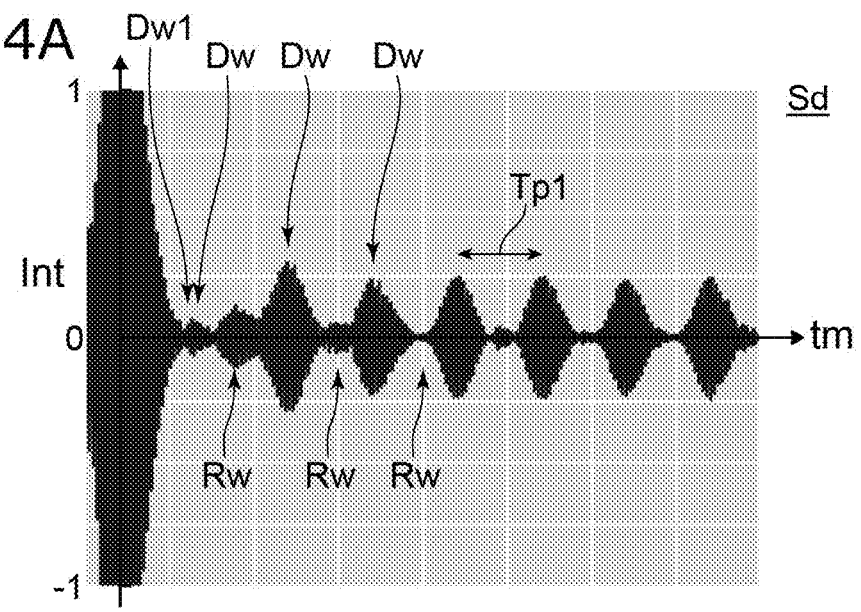
FIGS. 4A to 4C are schematic views illustrating the operation of the inspection device according to the first embodiment.
Figure 4B:
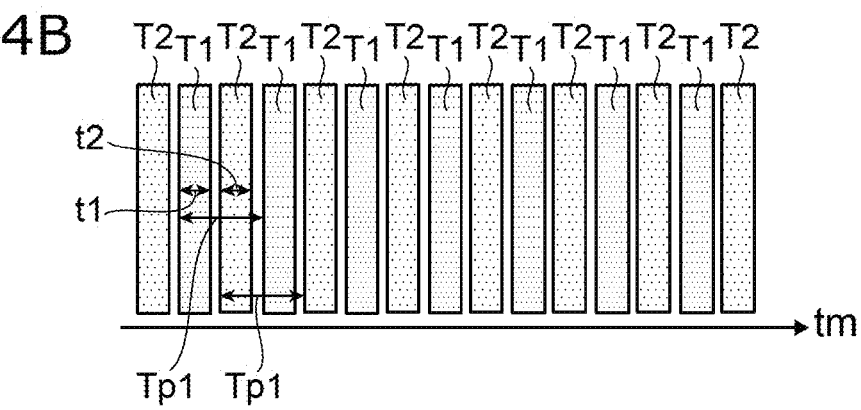
Figure 4C:
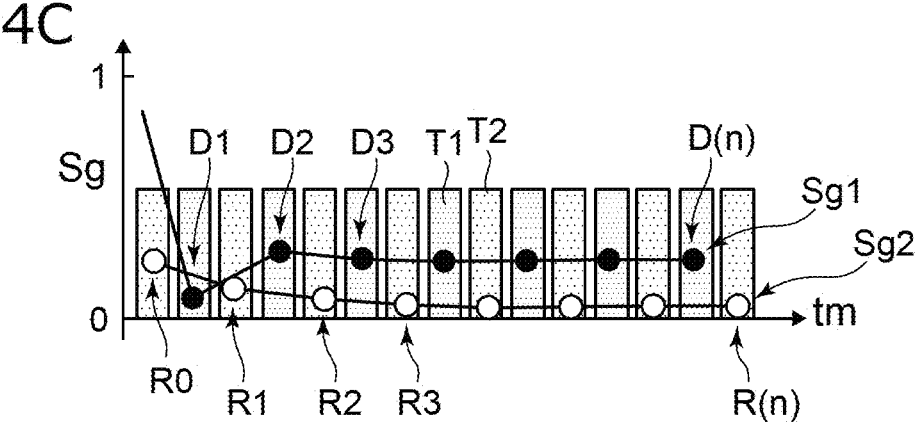

FIGS. 4A to 4C are schematic views illustrating the operation of the inspection device according to the first embodiment.

The horizontal axis of these figures is time tm. The vertical axis of FIG. 4A is the intensity Int of the signal Sd. The vertical axis of FIG. 4C corresponds to the magnitude Sg of the derived signal value.

As shown in FIG. 4A, also in this case, the signal Sd includes a plurality of direct waves Dw and a plurality of reflected waves Rw. In this example, the intensity Int (amplitude) of one of the plurality of direct waves Dw (wave Dw1) is lower than the intensity Int illustrated in FIG. 3A. The wave Dw1 having a low intensity Int is caused by, for example, a diffraction phenomenon occurring at the edge of the inspection object 80. At the edge of the inspection object 80, a waveform different from the central portion of the inspection object 80 may be obtained due to ultrasonic diffraction or the like. As shown in FIG. 4B, also in this case, a plurality of first periods T1 and a plurality of second periods T2 are defined.

As shown in FIG. 4C, a plurality of first signal values Sg1 and a plurality of second signal values Sg2 are derived. As shown in FIG. 4C, in this example, the signal value D1 among the plurality of first signal values Sg1 is remarkably small. The signal value D1 is smaller than the adjacent second signal value Sg2 (signal value R0 and signal value R1). This small signal value D1 corresponds to the above wave Dw1.

For example, when a signal value D1 smaller than the adjacent second signal value Sg2 is detected, it is determined that the detection is impossible. For example, when the processor 70 detects the signal value D1 smaller than the adjacent second signal value Sg2, the processor 70 outputs an output signal (inspection signal SI1: see FIG. 1) corresponding to the undetectability. The output signal corresponding to the undetectable may include any of data, display information, sound information, and the like. For example, even if the signal value D1 is small, the presence or absence of foreign matter is not determined.

As described above, in the first operation, the inspection includes outputting the inspection signal SI1 regarding the presence or absence of one of the plurality of first signal values Sg1 satisfying the following first conditions. In the first condition, one of the plurality of first signal values Sg1 is smaller than one of the plurality of second signal values Sg2. As described above, the one of the plurality of first signal values Sg1 is the maximum value of the signal Sd in one of the plurality of first periods T1. The one of the plurality of second signal values Sg2 is the maximum value of the signal Sd in one of the plurality of second periods T2.

Figure 5A:
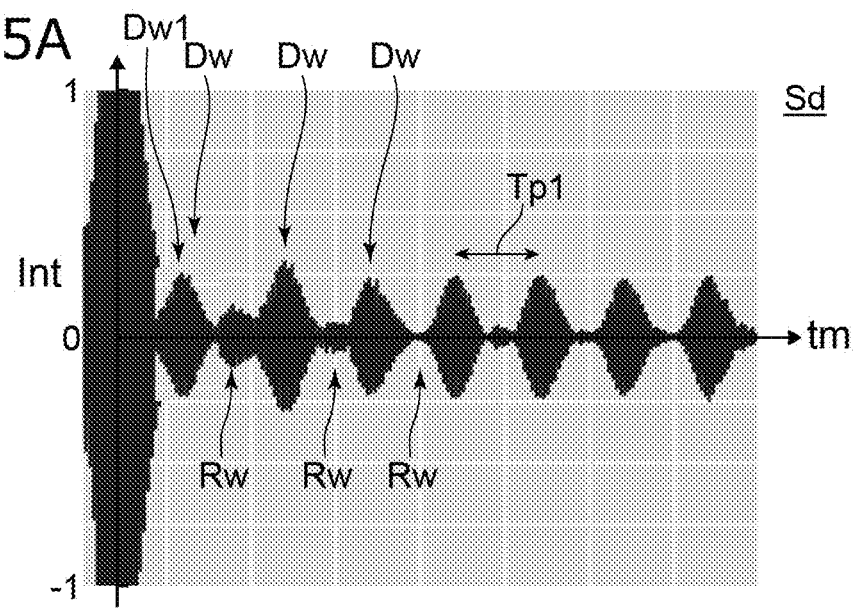
FIGS. 5A to 5C are schematic views illustrating the operation of the inspection device according to the first embodiment.
Figure 5B:
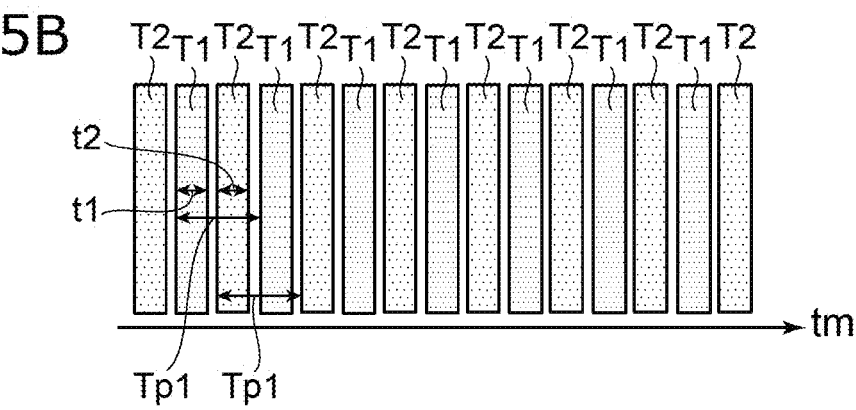
Figure 5C:
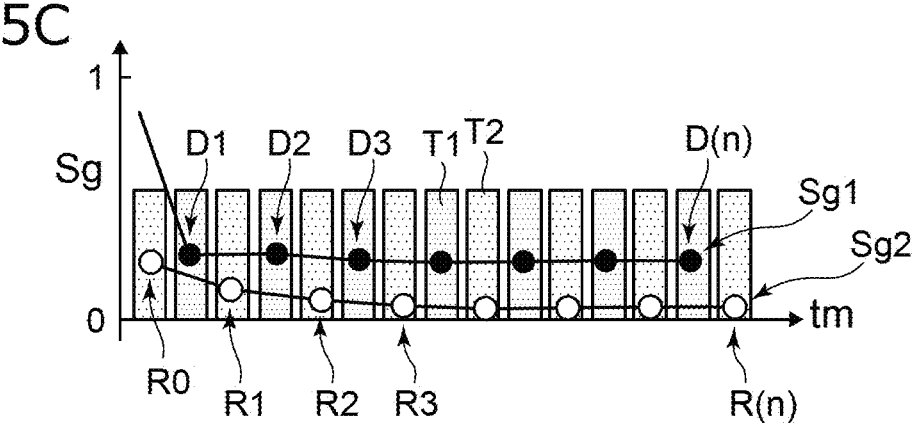

FIGS. 5A to 5C are schematic views illustrating the operation of the inspection device according to the first embodiment.

The horizontal axis of these figures is time tm. The vertical axis of FIG. 5A is the intensity Int of the signal Sd. The vertical axis of FIG. 5C corresponds to the magnitude Sg of the derived signal value.

As shown in FIG. 5A, also in this case, the signal Sd includes the plurality of direct waves Dw and a plurality of reflected waves Rw. In this example, the intensity Int (amplitude) of one of the plurality of direct waves Dw (wave Dw1) is smaller than the intensity Int illustrated in FIG. 3A. As shown in FIG. 5B, also in this case, the plurality of first periods T1 and the plurality of second periods T2 are defined.

As shown in FIG. 5C, a plurality of first signal values Sg1 and a plurality of second signal values Sg2 are derived. As shown in FIG. 5C, in this example, although the signal value D1 of the plurality of first signal values Sg1 is slightly small, the signal value D1 is greater than the adjacent second signal value Sg2 (signal value R0 and signal value R1). The signal value D1 corresponds to the wave Dw1 described above.

As described above, for example, when the signal value D1 smaller than the adjacent second signal value Sg2 is detected as shown in FIG. 4C, it is determined that the detection is impossible. On the other hand, in the example of FIG. 5C, it is not judged to be defective. The presence or absence of foreign matter is determined according to the signal strength of the first signal value Sg1.

There is a reference example of inspection using only a plurality of first signal values Sgt. In the reference example, a threshold value is set for a plurality of first signal values Sg1. For example, when one of the plurality of first signal values Sg1 is smaller than the threshold value, it is determined to be defective. In this reference example, if the signal value D1 illustrated in FIG. 5C is smaller than the threshold value, it is determined to be defective. In such a reference example, when the small signal value D1 is detected, is has been found that it is difficult to distinguish whether the inspection object 80 has a small signal value caused by a foreign substance or an end portion of the inspection object 80. If the signal value is small due to the end of the inspection object 80, it should not be judged as defective. In the reference example, it was found that detection error is likely to occur.

On the other hand, in the embodiment, the inspection is performed based on both the plurality of first signal values Sg1 and the plurality of second signal values Sg2, instead of being based only on the plurality of first signal values Sg1. Thereby, the detection can be suppressed. As a result, high inspection accuracy can be obtained.

For example, one of the plurality of first signal values Sg1 and the second signal value Sg2 adjacent to the one of the plurality of first signal values Sg1 are compared. The adjacent second signal value Sg2 may be before or after the one of the plurality of first signal values Sg1.

In one example of the first condition, the one of the plurality of second signal values Sg2 may be before of the one of the plurality of first signal values Sg1. In another example of the first condition, the one of the plurality of second signal values Sg2 may be after the one of the plurality of first signal values Sg1.

In the first condition, for example, the one of the plurality of first signal values Sg1 is not more than 0.8 times the one of the plurality of second signal values Sg2. For example, the detection error can be suppressed more effectively.

A ratio of the one of the plurality of first signal values Sg1 to the one of the plurality of second signal values Sg2 is defined as a ratio Cr1. For example, when the first signal value Sg1 having the ratio Cr1 of not more than 0.8 is detected, it may be determined that the detection is impossible.

A probability that the end of the inspection object 80 is judged to be a foreign substance is defined as a detection error rate. In the reference example in which only the plurality of first signal values Sg1 are used, the detection error rate Pe1 is 41%. On the other hand, in the embodiment using the plurality of first signal values Sg1 and the plurality of second signal values Sg2, the detection error rate of 1% or less can be obtained.

Hereinafter, a change in the detection error rate when the ratio Cr1 is changed will be described.

Figure 6:
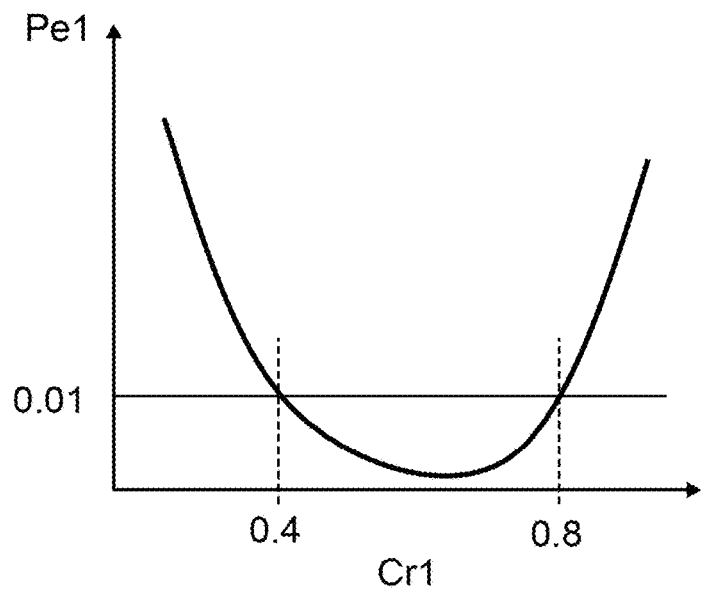
FIG. 6 is a graph illustrating characteristics of the inspection device according to the first embodiment.

FIG. 6 is a graph illustrating characteristics of the inspection device according to the first embodiment.

The horizontal axis of FIG. 6 is the ratio Cr1. The vertical axis is the detection error rate Pe1. The detection error rate Pe1 is a probability of erroneously determining the signal drop based on the end of the inspection object 80 as a foreign substance.

As shown in FIG. 6, when the ratio Cr1 is not less than 0.4 and not more than 0.8, the detection error rate Pe1 being low can be obtained. The ratio Cr1 is preferably not less than 0.4 and not more than 0.8. For example, in the first condition, the one of the plurality of first signal values Sg1 is preferably not more than the product of the one of the plurality of second signal values Sg2 and a first value. The first value is not less than 0.4 and not more than 0.8. The one of the plurality of second signal values Sg2 is next to the one of the plurality of first signal values Sg1.

In the embodiment, the length t1 of each of the plurality of first periods T1 (see FIG. 3B) is larger than 0.01 times and preferably not more than 0.3 times the first period Tp1. Thereby, the plurality of first signal values Sg1 can be derived with higher accuracy. The length t2 of each of the plurality of second periods T2 (see FIG. 3B)) is more than 0.01 times and preferably not more than 0.3 times the first period Tp1. Thereby, the plurality of second signal values Sg2 can be derived with higher accuracy.

In the first operation, the inspection signal SI1 may be further related to the presence or absence of another one of the plurality of first signal values Sg1 satisfying the following second condition. In the second condition, the other one of the plurality of first signal values Sg1 is smaller than the other one of the plurality of second signal values Sg2. The other one of the plurality of first signal values Sg1 is the maximum value of the signal Sd in another one of the plurality of first periods T1. The other one of the plurality of second signal values Sg2 is the maximum value of the signal Sd in the other one of the plurality of second periods T2. The other one of the plurality of first periods T1 is the closest to the one of the plurality of second periods T2 among the plurality of first periods T1.

In another example of the first operation, the other one of the plurality of first signal values Sg1 is the maximum value of the signal Sd in another one of the plurality of first periods T1. The other one of the plurality of second signal values Sg2 may be the maximum value of the signal Sd in further another one of the plurality of second periods T2. The other one of the plurality of first periods T1 is between the other one of the plurality of second periods T2 and the further another one of the plurality of second periods T2. The further another one of the plurality of second periods T2 is closest to the other one of the plurality of second periods T2 among the plurality of second periods T2.

In the embodiment, the processor 70 can perform an operation based on, for example, a value ID (n), a value IR (n−1), and a value IR (n). "N" is an integer of 2 or more. The value ID (n) is the maximum value of the signal Sd in the nth period of the plurality of first periods T1. The value IR (n−1) is the maximum value of the signal Sd in the (n−1) th period of the plurality of second periods T2. The (n−1) th period of the plurality of second periods T2 is the period immediately preceding the nth period of the plurality of first periods T1. The value IR (n) is the maximum value of the signal Sd in the nth period of the plurality of second periods T2. The nth period of the plurality of second periods T2 is the period immediately after the nth period of the plurality of first periods T1. For example, the nth period of the plurality of first periods T1 is between the (n−1) th period of the plurality of second periods T2 and the nth period of the plurality of second periods T2.

The processor 70 detects at least one of the plurality of first periods T1, for example. In the at least one of the plurality of first periods T1, the value ID (n), the value IR (n−1), and the value IR (n) satisfy a first equation or a second equation.

$$ID(n) < IR(n) \tag{1}$$

$$ID(n) < IR(n-1) \tag{2}$$

By detecting at least one of the plurality of first periods T1 satisfying the first equation or the second equation, the foreign matter of the inspection object 80 can be efficiently inspected. For example, the influence of the signal caused by the edge of the inspection object 80 can be suppressed. A low detection error rate Pe1 can be obtained.

The processor 70 may detect the first period T1 that satisfies a third equation or a fourth equation.

$$ID(n) \leq IR(n) \times a1 \tag{3}$$

$$ID(n) \leq IR(n-1) \times a2 \tag{4}$$

In the third equation, "a1" is not less than 0.4 and not more than 0.8. In the fourth equation, "a2" is not less than 0.4 and not more than 0.8.

The processor 70 detects, for example, one of a plurality of first periods T1. In the one of the plurality of first periods T1, the value ID (n) and the value IR (n+1) satisfy a fifth equation.

$$ID(n) < IR(n+1) \tag{5}$$

The processor 70 may detect the first period T1 that satisfies sixth equation.

$$ID(n) IR(n+1) \times a3 \tag{6}$$

In the sixth equation, "a3" is not less than 0.4 and not more than 0.8.

Based on the judgment based on the value ID (n) and the value IR (n+1), the detection error can be suppressed more stably and a highly accurate inspection can be performed.

Second Embodiment

The second embodiment relates to the processing device 75 (see FIG. 1).

As shown in FIG. 1, the processing device 75 includes the processor 70. The processor 70 is configured to obtain the signal Sd output from the receiver 20 and perform the following first operation. The first ultrasonic wave 10w including the plurality of burst waves 10b of the first period Tp1 transmitted from the transmitter 10 is incident on the inspection object 80 between the transmitter 10 and the receiver 20. The first ultrasonic wave 10w passed through the inspection object 80 is incident on the receiver 20. The receiver 20 outputs the signal Sd corresponding to the first ultrasonic wave 10w incident on the receiver 20. The signal Sd input to the processor 70 may be a signal obtained by amplifying the signal output from the receiver 20.

The first operation includes deriving the plurality of first signal values Sg1 and the plurality of second signal values Sg2 from the signal Sd. The first operation includes inspecting the inspection object 80 based on at least one of the plurality of first signal values Sg1 and at least one of the plurality of second signal values Sg2.

The plurality of first signal values Sg1 correspond to the maximum values of the signal Sd in each of the plurality of first periods T1 derived from the signal Sd and having the first period Tp1. The plurality of first signal values Sg1 correspond to the intensity of the direct wave of the first ultrasonic wave 10w. The plurality of second signal values Sg2 correspond to the maximum values of the signal Sd in each of the plurality of second periods T2 derived from the signal Sd and having the first period Tp1. The one of the plurality of first periods T1 is between the one of the plurality of second periods T2 and another of the plurality of second periods T2. The other one of the plurality of second periods T2 is the closest to the one of the plurality of second periods T2 among the plurality of second periods T2.

In the second embodiment, for example, the length t1 of each of the plurality of first periods T1 is smaller than 0.5 times the first period Tp1. For example, the length t2 of each of the plurality of second periods T2 is smaller than 0.5 times the first period Tp1.

In the second embodiment, for example, the length t1 of each of the plurality of first periods T1 may be larger than 0.01 times and not more than 0.3 times the first period Tp1. For example, the length t2 of each of the plurality of second periods T2 may be larger than 0.01 times and not more than 0.3 times the first period Tp1.

In the second embodiment, the inspection may include outputting the inspection signal SI1 regarding presence or absence of one of the plurality of first signal values Sg1 satisfying the following first condition. In the first condition, the one of the plurality of first signal values Sg1 is not more than the product of one of the plurality of second signal values Sg2 and the first value. The first value is, for example, not less than 0.4 and not more than 0.8. The one of the plurality of first signal values Sg1 is the maximum value of the signal Sd1 in the one of the plurality of first periods T1. The one of the plurality of second signal values Sg2 is the maximum value of the signal Sd in the one of the plurality of second periods T2.

As described above, the processor 70 may include the first circuit portion 71 and the second circuit portion 72 (see FIG. 1). The first circuit portion 71 is configured to derive the plurality of first signal values Sg1 and the plurality of second signal values Sg2 from the signal Sd. The second circuit portion 72 is configured to inspect the inspection object 80 based on at least one of the plurality of first signal values Sg1 and at least one of the plurality of second signal values Sg2.

In the second embodiment, detection error can be suppressed. An inspection device capable of improving inspection accuracy can be provided.

Third Embodiment

Figure 7:
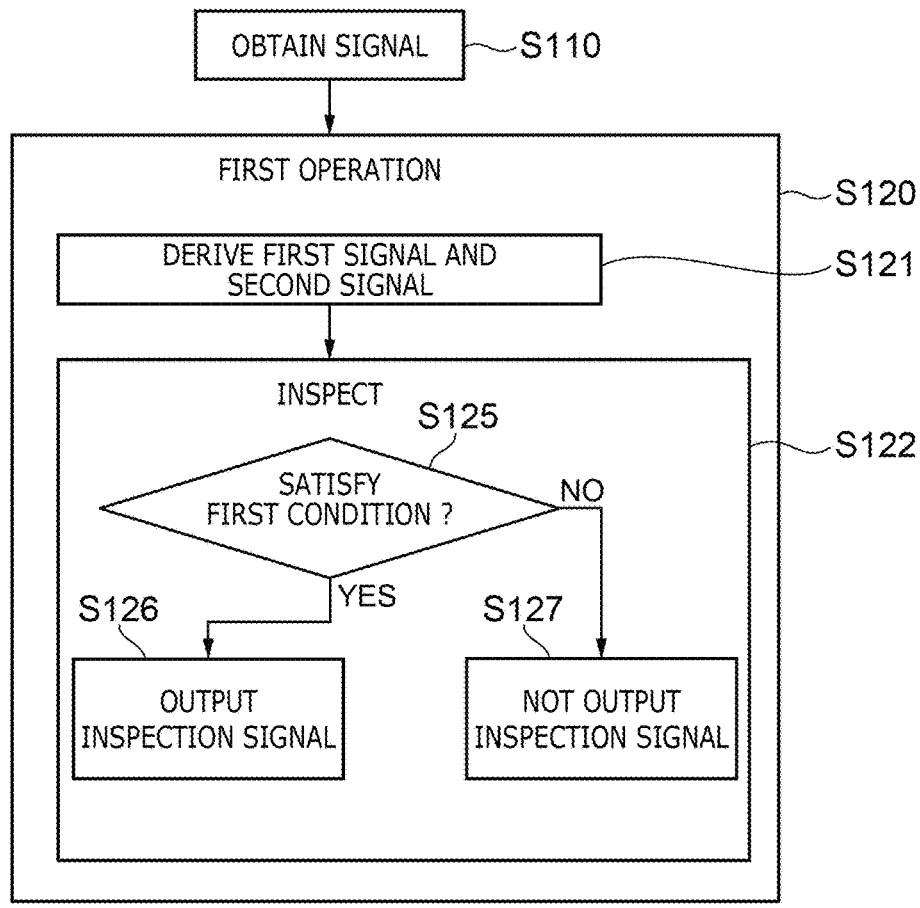
FIG. 7 is a flowchart illustrating an inspection method according to a third embodiment.

FIG. 7 is a flowchart illustrating an inspection method according to a third embodiment.

As shown in FIG. 7, in an inspection method according to the embodiment, the signal Sd output from the receiver 20 is obtained (step S110), and the first operation is performed (step S120).

As described above, the first ultrasonic wave 10w including the plurality of burst waves 10b of the first period Tp1 transmitted from the transmitter 10 is incident on the inspection object 80 between the transmitter 10 and the receiver 20. The first ultrasonic wave 10w passed through the inspection object 80 is incident on the receiver 20. The receiver 20 outputs a signal Sd corresponding to the first ultrasonic wave 10w incident on the receiver 20.

As shown in FIG. 7, the first operation includes deriving a plurality of first signal values Sg1 and a plurality of second signal values Sg2 from the signal Sd (step S121). The first operation includes inspecting the inspection object 80 based on at least one of the plurality of first signal values Sg1 and at least one of the plurality of second signal values Sg2 (step S122).

As described above, the plurality of first signal values Sg1 correspond to the maximum values of the signal Sd in each of the plurality of first periods T1 derived from the signal Sd and having the first period Tp1. The plurality of first signal values Sg1 correspond to the intensity of the direct wave of the first ultrasonic wave 10w. The plurality of second signal values Sg2 correspond to the maximum values of the signal Sd in each of the plurality of second periods T2 derived from the signal Sd and having the first period Tp1. One of the plurality of first periods T1 is between one of the plurality of second periods T2 and another of the plurality of second periods T2. The other one of the plurality of second periods T2 is the closest to the one of the plurality of second periods T2 among the plurality of second period T2s.

For example, the length t1 of each of the plurality of first periods T1 is smaller than 0.5 times the first period Tp1. For example, the length t2 of each of the plurality of second periods T2 is smaller than 0.5 times the first period Tp1. For example, the length t1 of each of the plurality of first period Tp1s may be larger than 0.01 times and not more than 0.3 times the first period Tp1. The length t2 of each of the plurality of second periods T2 is larger than 0.01 times and not more than 0.3 times the first period Tp1.

The inspecting (step S122) may include outputting the inspection signal SI1 regarding presence or absence of one of the plurality of first signal values Sg1 satisfying the first condition. In the first condition, the one of the plurality of first signal values Sg1 is not more than the product of one of the plurality of second signal values Sg2 and the first value. The first value is, for example, not less than 0.4 and not more than 0.8. The one of the plurality of first signal values Sg1 is the maximum value of the signal Sd in the one of the plurality of first periods T1. The one of the plurality of second signal values Sg2 is the maximum value of the signal Sd in the one of the plurality of second periods T2.

The inspecting (step S122) may include the following steps S125 to S127. For example, it is determined whether or not the first condition is satisfied for the plurality of first signal values Sg1 (step S125). When at least one of the plurality of first signal values Sg1 satisfies the first condition, the inspection signal SI1 is output (step S126). If the plurality of first signal values Sg1 do not satisfy the first condition, the inspection signal SI1 is not output (step S127), then the inspection signal SI1 corresponds to the fact that the plurality of signals of the first period T1 cannot be detected. The inspection result changes depending on whether the first condition is satisfied or not.

Embodiments may include the following configurations (e.g., technological proposals).

Configuration 1

An inspection device, comprising:

a transmitter configured to transmit a first ultrasonic wave including a plurality of burst waves of a first period;

a receiver, the first ultrasonic wave being configured to be incident on an inspection object between the transmitter and the receiver, the first ultrasonic wave passed through the inspection object being incident on the receiver, the receiver is configured to output a signal corresponding to the first ultrasonic wave incident on the receiver; and a processor configured to obtain the signal and to performing a first operation, the first operation including:

deriving a plurality of first signal values and a plurality of second signal values from the signal, and inspecting the inspection object based on at least one of the plurality of first signal values and at least one of the plurality of second signal values, the plurality of first signal values corresponding to maximum values of the signal in each of a plurality of first periods having the first period derived from the signal, the plurality of first signal values corresponding to an intensity of a direct wave of the first ultrasonic wave, the plurality of second signal values corresponding to maximum values of the signal in each of a plurality of second periods having the first period derived from the signal, one of the plurality of first periods being between one of the plurality of second periods and an other of the plurality of second periods, and the other one of the plurality of second periods being closest to the one of the plurality of second periods among the plurality of second periods.

Configuration 2

The device according to Configuration 1, wherein a length of each of the plurality of first periods is less than 0.5 times the first period, and a length of each of the plurality of second periods is less than 0.5 times the first period.

Configuration 3

The device according to Configuration 1, wherein a length of each of the plurality of first periods is not less than 0.01 times and not more than 0.3 times the first period, and a length of each of the plurality of second periods is not less than 0.01 times and not more than 0.3 times the first period.

Configuration 4

The device according to one of Configurations 1-3, wherein the inspecting includes outputting an inspection signal regarding presence or absence of one of the plurality of first signal values satisfying a first condition, the one of the plurality of first signal values is smaller than one of the plurality of second signal values in the first condition, the one of the plurality of first signal values is a maximum value of the signal in the one of the plurality of first periods, and the one of the plurality of second signal values is a maximum value of the signal in the one of the plurality of second periods.

Configuration 5

The device according to Configuration 4, wherein in the first condition, the one of the plurality of first signal values is not more than a product of the one of the plurality of second signal values and a first value, and the first value is not less than 0.4 and not more than 0.8.

Configuration 6

The device according to Configuration 4 or 5, wherein the one of the plurality of second signal values is before the one of the plurality of first signal values.

Configuration 7

The device according to Configuration 4 or 5, wherein the one of the plurality of second signal values is after the one of the plurality of first signal values.

Configuration 8

The device according to Configuration 4 or 5, wherein the inspection signal further relates to presence or absence of an other one of the plurality of first signal values satisfying a second condition, in the second condition, the other one of the plurality of first signal values is smaller than an other one of the plurality of second signal values, the other one of the plurality of first signal values is a maximum value of the signal in an other one of the plurality of first periods, and the other one of the plurality of second signal values is a maximum value of the signal in the other one of the plurality of second periods, the other one of the plurality of first periods is closest to the one of the plurality of first periods among the plurality of first periods.

Configuration 9

The device according to Configuration 4 or 5, wherein the inspection signal further relates to presence or absence of an other one of the plurality of first signal values satisfying a second condition;

in the second condition, the other one of the plurality of first signal values is smaller than other one of the plurality of second signal values, the other one of the plurality of first signal values is maximum value of the signal in an other one of the plurality of first periods, the other one of the plurality of second signal values is a maximum value of the signal in the further other one of the plurality of second periods, and the other one of the plurality of first periods is between the other one of the plurality of second periods and further other one of the plurality of second periods, and the further other one of the plurality of second periods is closest to the other one of the plurality of second periods among the plurality of second periods.

Configuration 10

The device according to one of Configurations 1-9, wherein the processor includes:

a first circuit portion configured to derive a plurality of first signal values and a plurality of second signal values from the signal, and a second circuit portion configured to inspect the inspection object based on at least one of the plurality of first signal values and at least one of the plurality of second signal values.

Configuration 11

A processing device, comprising:

a processor configured to obtain a signal output from a receiver and to perform a first operation, a first ultrasonic wave including a plurality of burst waves of a first period transmitted from the transmitter being incident on an inspection object between the transmitter and the receiver, the first ultrasonic wave passed through the inspection object being incident on the receiver, the receiver being configured to output the signal corresponding to the first ultrasonic wave incident on the receiver, the first operation including:

deriving a plurality of first signal values and a plurality of second signal values from the signal, and inspecting the inspection object based on at least one of the plurality of first signal values and at least one of the plurality of second signal values, the plurality of first signal values corresponding to maximum values of the signal in each of a plurality of first periods having the first period derived from the signal, the plurality of first signal values corresponding to an intensity of a direct wave of the first ultrasonic wave, the plurality of second signal values corresponding to a maximum value of the signal in each of a plurality of second periods having the first period derived from the signal, one of the plurality of first periods being between one of the plurality of second periods and an other of the plurality of second periods, and the other one of the plurality of second periods being closest to the one of the plurality of second periods among the plurality of second periods.

Configuration 12

The device according to Configuration 11, wherein a length of each of the plurality of first periods is less than 0.5 times the first period, and a length of each of the plurality of second periods is less than 0.5 times the first period.

Configuration 13

The device according to Configuration 11, wherein a length of each of the plurality of first periods is not less than 0.01 times and not more than 0.3 times the first period, and a length of each of the plurality of second periods is not less than 0.01 times and not more than 0.3 times the first period.

Configuration 14

The device according to one of Configurations 11-13, wherein the inspecting includes outputting an inspection signal regarding presence or absence of one of the plurality of first signal values satisfying a first condition, in the first condition, the one of the plurality of first signal values is not more than a product of one of the plurality of second signal values and a first value, the first value is not less than 0.4 and not more than 0.8, the one of the plurality of first signal values is a maximum value of the signal in the one of the plurality of first periods, and the one of the plurality of second signal values is a maximum value of the signal in the one of the plurality of second periods.

Configuration 15

The device according to one of Configurations 11-14, wherein the processor includes:

a first circuit portion configured to derive a plurality of first signal values and a plurality of second signal values from the signal, and a second circuit portion configured to inspect the inspection object based on at least one of the plurality of first signal values and at least one of the plurality of second signal values.

Configuration 16

An inspection method, comprising obtaining a signal output from a receiver, and performing a first operation, a first ultrasonic wave including a plurality of burst waves of a first period transmitted from the transmitter being incident on an inspection object between the transmitter and the receiver, the first ultrasonic wave passed through the inspection object being incident on the receiver, the receiver being configured to output the signal corresponding to the first ultrasonic wave incident on the receiver, the first operation including:

deriving a plurality of first signal values and a plurality of second signal values from the signal, and inspecting the inspection object based on at least one of the plurality of first signal values and at least one of the plurality of second signal values, the plurality of first signal values corresponding to maximum values of the signal in each of a plurality of first periods having the first period derived from the signal, the plurality of first signal values corresponding to an intensity of a direct wave of the first ultrasonic wave, the plurality of second signal values corresponding to a maximum value of the signal in each of a plurality of second periods having the first period derived from the signal, one of the plurality of first periods being between one of the plurality of second periods and an other of the plurality of second periods, and the other one of the plurality of second periods being closest to the one of the plurality of second periods among the plurality of second periods.

Configuration 17

The method according to Configuration 16, wherein a length of each of the plurality of first periods is less than 0.5 times the first period, and a length of each of the plurality of second periods is less than 0.5 times the first period.

Configuration 18

The method according to Configuration 16 or 17, wherein a length of each of the plurality of first periods is not less than 0.01 times and not more than 0.3 times the first period, and a length of each of the plurality of second periods is not less than 0.01 times and not more than 0.3 times the first period.

Configuration 19

The method according to one of Configurations 16-18, wherein the inspecting includes outputting an inspection signal regarding presence or absence of one of the plurality of first signal values satisfying a first condition, in the first condition, the one of the plurality of first signal values is not more than a product of one of the plurality of second signal values and a first value, the first value is not less than 0.4 and not more than 0.8, the one of the plurality of first signal values is a maximum value of the signal in the one of the plurality of first periods, and the one of the plurality of second signal values is a maximum value of the signal in the one of the plurality of second periods.

According to the embodiment, it is possible to provide an inspection device, a processing device, and an inspection method capable of improving inspection accuracy.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in inspection devices such as transmitters, receivers, supporters, transmitting circuits, receiving circuits, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all inspection devices, processing devices, and inspection methods practicable by an appropriate design modification by one skilled in the art based on the inspection devices, the processing devices, and the inspection methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device, comprising:
a transmitter configured to transmit a first ultrasonic wave including a plurality of burst waves of a first period;
a receiver, the first ultrasonic wave being configured to be incident on an inspection object between the transmitter and the receiver, the first ultrasonic wave passed through the inspection object being incident on the receiver, the receiver is configured to output a signal corresponding to the first ultrasonic wave incident on the receiver; and
a processor configured to obtain the signal and to performing a first operation,
the first operation including:
deriving a plurality of first signal values and a plurality of second signal values from the signal, and
inspecting the inspection object based on at least one of the first signal values and at least one of the second signal values,
the first signal values corresponding to maximum values of the signal in each of a plurality of first periods having the first period derived from the signal, the first signal values corresponding to an intensity of a direct wave of the first ultrasonic wave,
the second signal values corresponding to maximum values of the signal in each of a plurality of second periods having the first period derived from the signal,
one of the first periods being between one of the second periods and an other of the second periods, and the other one of the second periods being closest to the one of the second periods among the second periods.

2. The device according to claim 1, wherein
a length of each of the first periods is less than 0.5 times the first period, and
a length of each of the second periods is less than 0.5 times the first period.

3. The device according to claim 1, wherein
a length of each of the first periods is not less than 0.01 times and not more than 0.3 times the first period, and
a length of each of the second periods is not less than 0.01 times and not more than 0.3 times the first period.

4. The device according to claim 1, wherein
the inspecting includes outputting an inspection signal regarding presence or absence of one of the first signal values satisfying a first condition,
the one of the plurality of first signal values is smaller than one of the second signal values in the first condition,
the one of the first signal values is a maximum value of the signal in the one of the first periods, and
the one of the second signal values is a maximum value of the signal in the one of the second periods.

5. The device according to claim 4, wherein
in the first condition, the one of the first signal values is not more than a product of the one of the second signal values and a first value, and
the first value is not less than 0.4 and not more than 0.8.

6. The device according to claim 4, wherein the one of the second signal values is before the one of the first signal values.

7. The device according to claim 4, wherein the one of the second signal values is after the one of the first signal values.

8. The device according to claim 4, wherein
the inspection signal further relates to presence or absence of an other one of the first signal values satisfying a second condition,
in the second condition, the other one of the first signal values is smaller than an other one of the second signal values,
the other one of the first signal values is a maximum value of the signal in an other one of the first periods, and
the other one of the second signal values is a maximum value of the signal in the other one of the second periods,
the other one of the first periods is closest to the one of the first periods among the first periods.

9. The device according to claim 4, wherein
the inspection signal further relates to presence or absence of an other one of the first signal values satisfying a second condition;
in the second condition, the other one of the first signal values is smaller than other one of the second signal values, the other one of the first signal values is maximum value of the signal in an other one of the first periods, the other one of the second signal values is a maximum value of the signal in the further other one of the second periods, and the other one of the first periods is between the other one of the second periods and further other one of the second periods, and the further other one of the second periods is closest to the other one of the second periods among the second periods.

10. The device according to claim 1, wherein
the processor includes
a first circuit portion configured to derive a plurality of first signal values and a plurality of second signal values from the signal, and
a second circuit portion configured to inspect the inspection object based on at least one of the first signal values and at least one of the second signal values.

11. A processing device, comprising:
a processor configured to obtain a signal output from a receiver and to perform a first operation,
a first ultrasonic wave including a plurality of burst waves of a first period transmitted from a transmitter being incident on an inspection object between the transmitter and the receiver, the first ultrasonic wave passed through the inspection object being incident on the receiver, the receiver being configured to output the signal corresponding to the first ultrasonic wave incident on the receiver,
the first operation including:
deriving a plurality of first signal values and a plurality of second signal values from the signal, and
inspecting the inspection object based on at least one of the first signal values and at least one of the second signal values,
the first signal values corresponding to maximum values of the signal in each of a plurality of first periods having the first period derived from the signal, the first signal values corresponding to an intensity of a direct wave of the first ultrasonic wave,
the second signal values corresponding to a maximum value of the signal in each of a plurality of second periods having the first period derived from the signal,
one of the first periods being between one of the second periods and an other of the second periods, and the other one of the second periods being closest to the one of the second periods among the plurality of second periods.

12. The device according to claim 11, wherein
a length of each of the first periods is less than 0.5 times the first period, and
a length of each of the second periods is less than 0.5 times the first period.

13. The device according to claim 11, wherein
a length of each of the first periods is not less than 0.01 times and not more than 0.3 times the first period, and
a length of each of the second periods is not less than 0.01 times and not more than 0.3 times the first period.

14. The device according to claim 11, wherein
the inspecting includes outputting an inspection signal regarding presence or absence of one of the first signal values satisfying a first condition,
in the first condition, the one of the first signal values is not more than a product of one of the second signal values and a first value, the first value is not less than 0.4 and not more than 0.8, the one of the first signal values is a maximum value of the signal in the one of the first periods, and
the one of the second signal values is a maximum value of the signal in the one of the second periods.

15. The device according to claim 11, wherein
the processor includes:
a first circuit portion configured to derive a plurality of first signal values and a plurality of second signal values from the signal, and
a second circuit portion configured to inspect the inspection object based on at least one of the first signal values and at least one of the second signal values.

16. An inspection method, comprising: obtaining a signal output from a receiver, and performing a first operation, a first ultrasonic wave including a plurality of burst waves of a first period transmitted from the transmitter being incident on an inspection object between the transmitter and the receiver, the first ultrasonic wave passed through the inspection object being incident on the receiver, the receiver being configured to output the signal corresponding to the first ultrasonic wave incident on the receiver,
the first operation including:
deriving a plurality of first signal values and a plurality of second signal values from the signal, and
inspecting the inspection object based on at least one of the first signal values and at least one of the second signal values,
the first signal values corresponding to maximum values of the signal in each of a plurality of first periods having the first period derived from the signal, the first signal values corresponding to an intensity of a direct wave of the first ultrasonic wave,
the second signal values corresponding to a maximum value of the signal in each of a plurality of second periods having the first period derived from the signal,
one of the first periods being between one of the second periods and an other of the second periods, and the other one of the second periods being closest to the one of the second periods among the second periods.

17. The method according to claim 16, wherein
a length of each of the first periods is less than 0.5 times the first period, and
a length of each of the second periods is less than 0.5 times the first period.

18. The method according to claim 16, wherein
a length of each of the first periods is not less than 0.01 times and not more than 0.3 times the first period, and
a length of each of the second periods is not less than 0.01 times and not more than 0.3 times the first period.

19. The method according to claim 16, wherein
the inspecting includes outputting an inspection signal regarding presence or absence of one of the first signal values satisfying a first condition,
in the first condition, the one of the first signal values is not more than a product of one of the second signal values and a first value, the first value is not less than 0.4 and not more than 0.8,
the one of the first signal values is a maximum value of the signal in the one of the first periods, and
the one of the second signal values is a maximum value of the signal in the one of the second periods.

* * * * *